United States Patent
Centonza et al.

(10) Patent No.: US 9,226,186 B2
(45) Date of Patent: Dec. 29, 2015

(54) NODE AND METHOD FOR THE MANAGEMENT OF A USER EQUIPMENT TIME OFFSET MEASUREMENT

(71) Applicants: Angelo Centonza, Winchester (GB); Muhammad Kazmi, Bromma (SE)

(72) Inventors: Angelo Centonza, Winchester (GB); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 79 days.

(21) Appl. No.: 13/820,526

(22) PCT Filed: Jan. 15, 2013

(86) PCT No.: PCT/SE2013/050021
§ 371 (c)(1),
(2) Date: Mar. 4, 2013

(87) PCT Pub. No.: WO2014/054999
PCT Pub. Date: Apr. 10, 2014

(65) Prior Publication Data
US 2014/0274062 A1    Sep. 18, 2014

Related U.S. Application Data

(60) Provisional application No. 61/709,813, filed on Oct. 4, 2012.

(30) Foreign Application Priority Data

Jan. 11, 2013   (WO) ................ PCT/SE2013/050013

(51) Int. Cl.
*H04B 1/16*   (2006.01)
*H04W 24/10*   (2009.01)
(Continued)

(52) U.S. Cl.
CPC ............. *H04W 24/10* (2013.01); *H04W 8/26* (2013.01); *H04L 61/2038* (2013.01); *H04L 61/2046* (2013.01); *H04W 36/0094* (2013.01); *H04W 84/045* (2013.01)

(58) Field of Classification Search
CPC ............................ H04W 64/00; G01S 19/05
USPC ............. 455/62, 434, 426.1, 456.1, 42, 502, 455/423, 13.2; 342/357.25, 357.44
See application file for complete search history.

(56) References Cited

U.S. PATENT DOCUMENTS

2002/0098839 A1\* 7/2002 Ogino ................ G01S 5/02 455/424
2007/0072621 A1\* 3/2007 Mukkavilli ........... G01S 5/021 455/456.1

(Continued)

FOREIGN PATENT DOCUMENTS

WO    2009131506 A1   10/2009

OTHER PUBLICATIONS

3rd Generation Partnership Project, "3rd Generation Partnership Project; Technical Specification Group Radio Access Network; Mobility procedures for Home Node B (HNB); Overall description; Stage 2 (Release 10)", Technical Specification, 3GPP TS 25.367 V10.0.0, Mar. 1, 2011, pp. 1-14, 3GPP, France.

(Continued)

*Primary Examiner* — Kiet Doan
(74) *Attorney, Agent, or Firm* — Coats & Bennett, PLLC

(57) ABSTRACT

Example embodiments presented herein are directed towards a network node (401A, 401B) (e.g., a source or target base station), and corresponding method therein, for managing a user equipment time offset measurement by accounting for a user equipment mobility profile. The management may involve a source network node (401A) delaying or preventing the sending of a user equipment timing offset measurement to a target network node (401B) or sending an indication or a reliability of the user equipment timing offset measurement. The network node (401A, 401B) may further apply a compensation to the user equipment timing offset measurement to account for an expected behavior of the user equipment based on the mobility profile. The network node (401A, 401B) may also adapt an uplink search window based on the user equipment mobility profile.

18 Claims, 6 Drawing Sheets

(51) Int. Cl.
*H04W 8/26* (2009.01)
*H04L 29/12* (2006.01)
*H04W 36/00* (2009.01)
*H04W 84/04* (2009.01)

(56) References Cited

U.S. PATENT DOCUMENTS

| | | |
|---|---|---|
| 2010/0216481 A1 | 8/2010 | Gormley |
| 2011/0217934 A1* | 9/2011 | Oga ............................. 455/62 |
| 2013/0130694 A1* | 5/2013 | Kherani ............ H04W 28/0263 455/437 |

OTHER PUBLICATIONS

3rd Generation Partnership Project, "3rd Generation Partnership Project; Technical Specification Group Radio Access Network; Automatic Neighbour Relation (ANR) for UTRAN; Stage 2 (Release 10)", Technical Specification, 3GPP TS 25.484 V10.0.0, Jun. 1, 2011, pp. 1-20, 3GPP, France.

3rd Generation Partnership Project, "3rd Generation Partnership Project; Technical Specification Group Radio Access Network; Radio Resource Control (RRC); Protocol specification (Release 10)", 3GPP TS 25.331 V10.3.1, Apr. 1, 2011, pp. 1-1863, 3GPP, France.

Qualcomm Incorporated, et al., "Legacy UE Macro to HNB Active Hand-in", 3GPP TSG RAN WG3 #73bis, Oct. 10, 2011, pp. 1-4, 3GPP, Zhuhai, China.

Alcatel-Lucent, et al. "Macro to small cell, metro cell Hand-in", 3GPP TSG-RAN3 Meeting #73, Aug. 22, 2011, pp. 1-8, 3GPP, Athens, Greece.

3rd Generation Partnership Project, "3rd Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11)", Technical Specification, 3GPP TR 37.803 V11.0.0, Jun. 1, 2012, pp. 1-120, 3GPP, France.

3rd Generation Partnership Project, "3rd Generation Partnership Project; Technical Specification Group Radio Access Network; Physical layer; Measurements (FDD) (Release 10)", Technical Specification, 3GPP TS 25.215 V10.0.0, Mar. 1, 2011, pp. 1-23, 3GPP, France.

3rd Generation Partnership Project, "3rd Generation Partnership Project; Technical Specification Group Radio Access Network; UTRAN architecture for 3G Home Node B (HNB); Stage 2 (Release 10)", Technical Specification, 3GPP TS 25.467 V10.2.0, Jun. 1, 2011, pp. 1-58, 3GPP, France.

* cited by examiner

NODE AND METHOD FOR THE MANAGEMENT OF A USER EQUIPMENT TIME OFFSET MEASUREMENT

TECHNICAL FIELD

Example embodiments presented herein are directed towards a network node (e.g., a source or target base station), and corresponding method therein, for managing a user equipment time offset measurement by accounting for a user equipment mobility profile.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus may be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Emerging mobile network trends may call for denser deployments in urban areas, due to increasing traffic and/or user density. Operators are looking to deploy smaller cells (e.g., pico and femto cells) in the same areas as macro cells, with varying degrees of "cooperation" and/or integration between them according to the desired level of network performance (so-called "HetNet deployments" or heterogeneous network deployments). A significant issue in such deployments is to provide increased/optimum mobility to UEs (user equipment nodes, also referred to as wireless terminals) that have different capabilities while providing/ensuring a reduced/lowest level of core network (CN) involvement, to reduce signaling traffic.

In WCDMA (Wide Band Code Division Multiple Access) systems, a user equipment that supports 3GPP Release 9 or later releases may be able to provide specific measurements to support mobility towards femto cells. In particular, these user equipments may be able to improve mobility towards closed HNB (Home Node B) cells, also known as CSG (Closed Subscriber Group) cells, by providing a Proximity Indication and specific System Information measurements that allow the serving RNC (Radio Network Controller) to disambiguate the target cell and to trigger the appropriate relocation procedures towards the right target. It has to be noted that the term Serving RNC (SRNC) can refer to either a HNB or an RNC.

SUMMARY

An example of a measurement that may be used in various network related procedures is a user equipment time offset. Such a measurement may be utilized during mobility procedures, for example a handover or routing area update, etc. The user equipment time offset measurement may be used in providing synchronization during various procedures. However, it should be appreciated that the value of the user equipment offset timing measurement may change depending on whether or not the user equipment is mobile. Currently, means do not exists for providing a dynamic user equipment offset timing measurement, or altering such measurement based on the mobility of the user equipment.

Thus, example embodiments presented herein may be directed towards the management of a user equipment time offset measurement in order to account for the mobility or expected mobility of the user equipment. At least one example advantage of the example embodiments may be allowing the source RAN to evaluate whether measurements provided by the user equipment for support of target cell identification are likely to be valid by the time they are received by the target RAN and used for target cell disambiguation.

Accordingly, some of the example embodiments may be directed toward a method, in a network node, for managing an user equipment time offset measurement. The method comprises obtaining, from a user equipment or a serving radio network node, a user equipment time offset measurement. The method also comprises obtaining, from the user equipment or the serving radio network node, a user equipment mobility profile. The method further comprises managing the user equipment time offset measurement based on expected user equipment mobility behavior derived from the user equipment mobility profile.

Some of the example embodiments may be directed towards a network node for management of a user equipment time offset measurement. The network node comprises radio circuitry configured to receive, from a user equipment or a serving radio network node, a user equipment time offset measurement. The radio circuitry is further configured to receive, from the user equipment or the serving radio network node, a user equipment mobility profile. The network node further comprises processing circuitry configured to manage the user equipment time offset measurement based on expected user equipment mobility behavior derived from the user equipment mobility profile.

DEFINITIONS

3GPP 3rd Generation Partnership Project
A-GNSS Assisted GNSS

ANR Automatic Neighbor Relation
AoA Angle of Arrival
BS Base Station
CDMA Code Division Multiple Access
CFN Connection Frame Number
CGI Cell Global Identity
C-ID Cell Identity
CN Core Network
CSG Closed Subscriber Group
D2D Device to Device
DCH Dedicated Channel
DL Downlink
DMRS Demodulation Reference Signal
DoA Direction of Arrival
DPCCH Dedicated Physical Control Channel
E-UTRAN Evolved UTRAN
GERAN GSM/EDGE Radio Access Network
GSM Global System for Mobile communications
GNSS Global Navigation Satellite System
GW Gateway
HMS HNB Management System
HNB Home Node B
HO Handover
HRPD High Rate Packet Data
LAC Location Area Code
LTE Long-Term Evolution
MSR Multiple Standard Radio
NB Node B
NCI Neighbor Cell Identifier
NMS Network Management System
NRT Neighbor Relation Table
O&M/OAM Operations and Maintenance system
OSS Operational Support Systems
OTD Observed Time Delay
OTDOA Observed Time Difference of Arrival
PCI Physical Cell Identity
PRACH Physical Random Access CHannel
PSC Primary Scrambling Code
PLMN Public Land Mobile Network
RAN Radio Access Network
RAC Routing Area Code
RNC Radio Network Controller
RTT Round Trip Time
Rx Receive/Receiver
SFN System Frame Number
SRNC Serving RNC
SIB System Information Block
Tx Transmit/Transmitter
UE User Equipment
UL Uplink
UTDOA Uplink Time Difference of Arrival
UTRAN Universal Terrestrial Radio Access Network

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

General Overview

In order to better explain the example embodiments presented herein, a problem will first be identified and discussed. During operation, in LTE for example, a user equipment blindly detects the neighbor cells including HeNBs. This means user equipment will typically know the timing of a certain number of the strongest HeNB or CSG HeNB. More especially the user equipment may determine the frame start timing of one or more target CSG HeNBs, which are close to the serving node of the user equipment.

Figure 1:
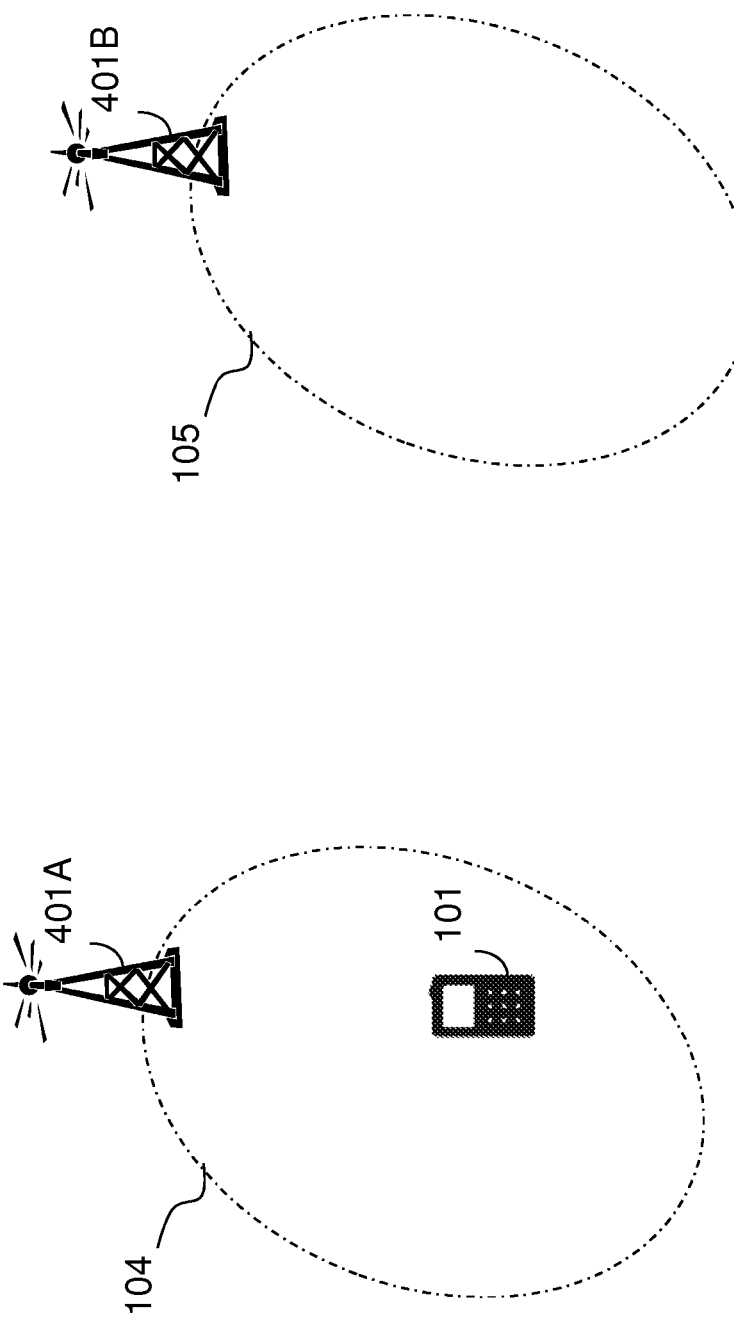
FIG. 1 is a simplified schematic of a wireless communications system.
Figure 2:
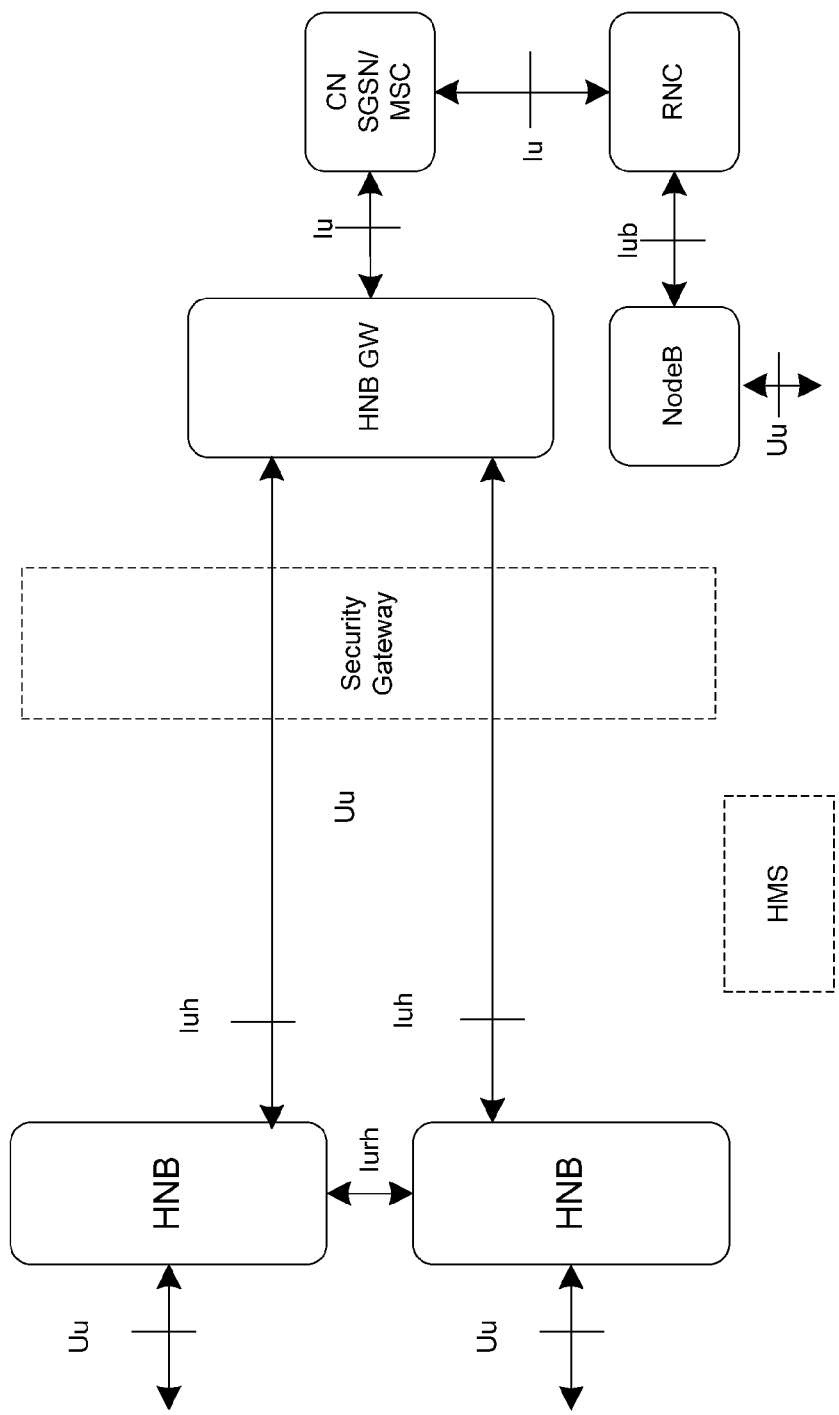
FIG. 2 is an illustrative example of HNB architecture.

FIG. 1 provides an illustrative example of the scenario described above. A user equipment 101 may be in proximity to a non-serving cell 105. The user equipment may be able to determine a user equipment time offset with respect to the non-serving cell 105 or a network node 401B associated with the non-serving cell. The user equipment may provide the time offset information to a serving network node 401A. The serving network node 401A, which may be serving the user equipment via a serving cell 104, may thereafter send the time offset information with the network node 401B associated with the non-serving cell 105. Upon receiving the user equipment time offset information, the network node 401B may, for example, perform measurements or mobility or relocation procedures (e.g., a handover) using the time offset information. Once the mobility or relocation procedures are triggered there can be several different types of signaling procedures that can be followed. According to the architecture shown in FIG. 2, mobility signaling towards a CSG cell may either go through the CN (Iu based mobility) or, in case of a CSG cell to CSG cell mobility, it may be routed via the Iuh interface without passing through the CN.

In LTE the user equipment may determine the time differences between its UL transmit timing and DL received timing of the target cell. The UL transmit timing can be the UL frame timing which can be determined when the user equipment transmits a reference signal, for example, demodulation reference signal (DMRS), sounding reference signal (SRS), etc.

This time difference measurement may be defined as the user equipment UL transmit time offset with respect to the target cell frame boundary or user equipment UL transmit time offset with respect to the target cell received time. More specifically, received timing is that of the downlink radio frame #i from the target cell, defined by the first detected path in time. Furthermore, user equipment transmit timing is that of uplink radio frame #i.

The LTE user equipment UL transmit time offset with respect to the target cell received time is therefore analogous to a HSPA user equipment UL PSC and UL DPCCH chip offset with respect to the target cell frame boundary. Even the HSPA "UE UL PSC and UL DPCCH chip offset with respect to the target cell frame boundary" may be generalized to "UE UL transmit timing offset with respect to the target cell frame boundary".

In HSPA and LTE there are several user equipment and BS timing measurements which are performed on signals involving user equipment transmissions. Examples of user equipment timing measurements (i.e., performed by a user equipment) in HSPA are SFN-CFN observed time difference, SFN-SFN observed time difference and user equipment Rx-Tx time difference. This is defined in 3GPP TS 25.133.

Examples of BS timing measurements are measurements performed by the BS, these measurements may also be known as UTRAN measurements. In HSPA these measurements may include PRACH propagation delay, for example, one way Propagation delay, which may also be measured by the BS on UL DPCCH or on any UL pilot signals, etc. It is defined in 3GPP TS 25.133. It is also possible for the BS to measure BS Rx-Tx time difference which is analogous to a user equipment Rx-Tx time difference.

An example of a user equipment timing measurement (i.e. performed by the user equipment) in LTE is a UE Rx-Tx time difference. This are defined in 3GPP TS 36.133. Examples of BS timing measurements performed by BS may also be known as E-UTRAN measurements. In LTE these measurements may include BS Rx-Tx time difference, timing advance (TA) and PRACH propagation delay (e.g., one way Propagation delay). This is defined in 3GPP TS 36.133. It is also possible for an LTE BS to measure one way propagation delay on signals sent by the user equipment. These measurements are used for various purposes, for example, mobility or cell change, positioning, adjusting parameters of radio receiver at the BS, etc.

The measurements reported by the user equipment on DPCCH chip offset indicate the number of chips between DPCCH signal transmission and target cell frame boundary. However, this measurement might become obsolete by the time it reaches the target BS and is used for UL detection. In fact, if the user equipment moves closer or farther from the target BS, the chip offset will change. If the target BS attempts to perform uplink detection on the basis of an outdated chip offset value, this may result in either not detecting the user equipment or in detecting the wrong user equipment (i.e. another user equipment with same UL PSC).

Overview of the Example Embodiments

A need exists to provide accurate user equipment timing offset measurements. The example embodiments presented herein are directed towards the provisioning of measurements from a serving RNC to a target RNC (e.g., a target HNB GW). The serving node (e.g., serving RNC) may have information about the user equipment mobility profile, for example, speed, acceleration, direction of movement, position. If the serving RNC detects that the user equipment is moving in a way that the Chip Offset measurements provided to target node (e.g. RNC) may become obsolete by the time the user equipment UL detection starts, then the serving node (e.g. serving RNC) may either avoid sending such measurements (to prevent erroneous UL detection) to the target node (e.g. RNC) or it may alter the measurements so as to ensure that they are still correct at the time they are received and used for UL detection. Yet according to another embodiment the serving node (e.g. serving RNC) may inform about the user equipment mobility profile and/or deployment scenario (e.g. served by BS deployed to serve users in high speed train etc.) to the target node (e.g. target RNC) along with the timing measurements. The target node (e.g. target RNC) can either alter (i.e. apply compensation) the measurement or it can request the target radio node to adapt its search window for searching UL signals from the user equipment.

Thus, according to some of the example embodiments, a method for determining a user equipment mobility profile is provided. According to some of the example embodiments, a network node (e.g., a base station) may be able to determine different scenarios that may be applicable for using the user equipment timing offset measurement. According to some of the example embodiments, the network node may be configured to alter the user equipment timing offset measurement. According to some of the example embodiments, the network node (e.g., a target base station) may be configured to adapt an uplink signal search window to account for the user equipment mobility profile.

It should be appreciated that the example embodiments presented herein are applicable to any type of radio network node for example, a base station, eNode B, multi-standard radio (MSR) radio node, Node B, access point, relay, donor node serving or controlling a relay, etc. Similarly, the example embodiments are applicable to any type of user equipment, for example, target device, mobile terminal, wireless terminal, wireless terminal used for machine type communication, wireless device used for device to device (D2D) communication, etc.

In LTE, the user equipment UL transmit time offset with respect to the target cell received time may be used by the HeNB to detect the user equipment UL received signal. Therefore, the example embodiments are applicable in a scenario where any "UE UL transmit timing offset with respect to the target cell frame boundary" measurement is used in the network for detecting the user equipment uplink received signals. The example embodiments are also therefore applicable to any radio access technology, for example, HSPA, LTE, GSM/GERAN, CDMA2000 1xRTT, HRPD, etc., and to any case where target cell selection is enhanced by means of UL detection.

The example embodiments may not only be used in cases of mobility but also in cases of heterogeneous networks in which a target cell is not necessarily fully active and needs to be activated or in general enter a state according to which the user equipment may be fully served. In the latter cases activation of the target cell could be based on UL detection of the user equipment, which could be supported by means of measurements reported by the user equipment and processed and forwarded by source RAN.

Figure 3:
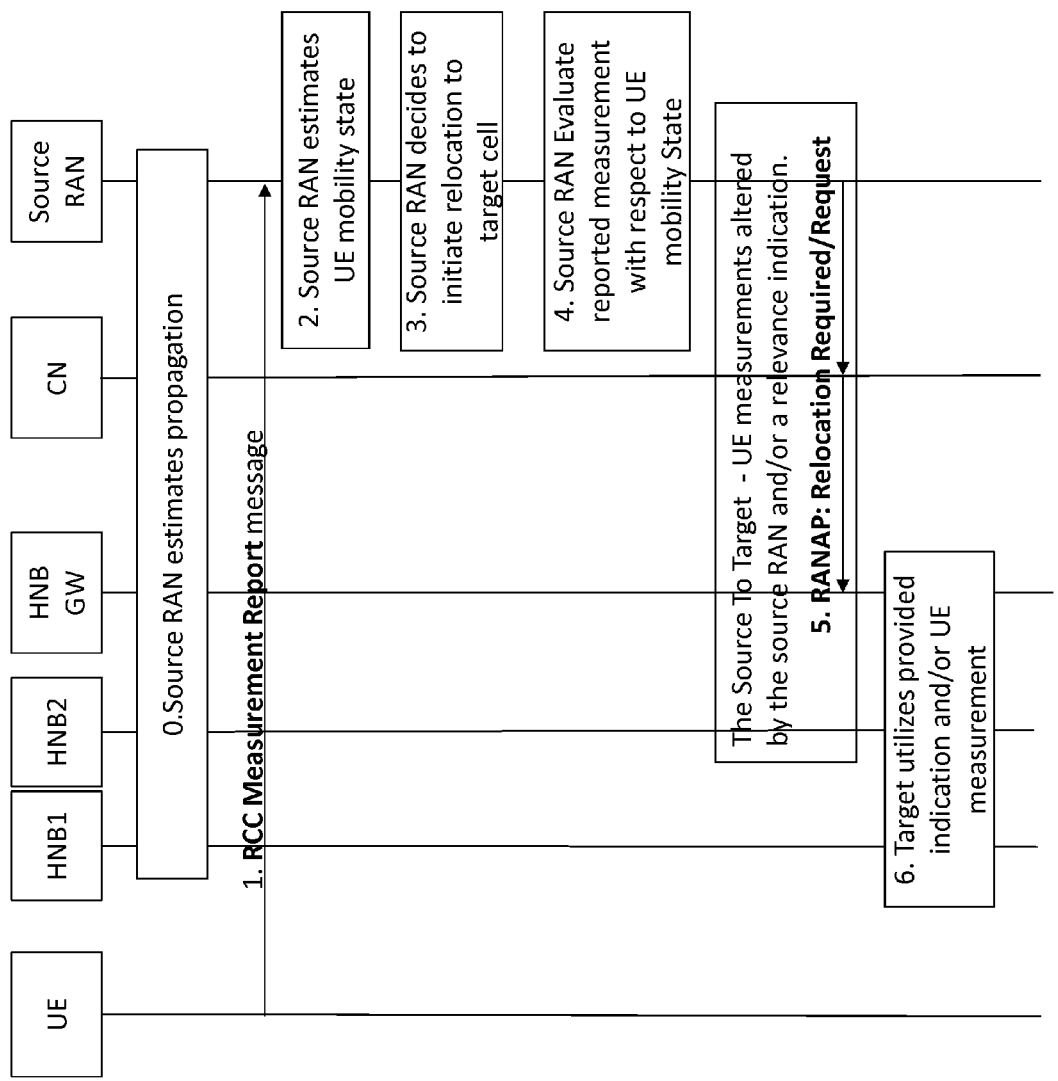
FIG. 3 is a messaging diagram illustrating some of the example embodiments presented herein.

A summary of the example embodiments is provided in FIG. 3. First, a source network node (e.g., a source RAN) may estimate propagation delays to a target network node (e.g., a target RAN) (step 0). The estimation performed by the source RAN may be provided by monitoring, for example, RTT for procedures such as Relocation which may involve sending request and response messages to the target RAN. The source RAN may also receive a RRC measurement report from a user equipment (step 1). The measurement report may comprise timing offset measurements such as a DPCCH Chip Offset. Upon receiving the measurement report the source RAN may estimate a mobility state or profile for the user equipment (step 2).

Thereafter, the source RAN may decide to initiate a relocation to a target cell (step 3). The source RAN may then evaluate the mobility profile and timing offset measurements (step 4). According to some of the example embodiments, the source RAN may decide to not send or delay a sending of the timing offset measurement if the mobility profile of the user equipment indicates that the timing offset measurement will soon be unreliable. The source RAN may also alter the timing offset measurement based on the mobility profile (e.g., based on an expected mobility behavior). It should also be appreciated that the source RAN may provide instructions or an indication to a target RAN with respect to how the user equipment mobility should be incorporated into the timing offset measurement.

Thereafter, the source RAN may send the target RAN the timing offset measurement as well as any other relevant information associated with a relocation or any other form of request (step 5). The target node may then use the provided information (step 6). According to some of the example embodiments, the target node may alter the timing offset measurement itself. According to some of the example embodiments, the target node may adapt an uplink search window for searching for uplink signals from the user equipment. The adaption may be provided as a function of any indications or instructions provided by the source target node.

The remainder of the text describes the example embodiments according to corresponding sub-headings. First, example embodiments related to the determination of a mobility profile are provided under the sub-heading 'Determination of a user equipment mobility profile". Thereafter, situations in which the user timing offset measurement may be used is provided under the sub-heading "Applicable scenarios for using user equipment timing offset measurements". Various methods for managing the timing offset measurement and/or procedures using the timing offset measurement with respect to the mobility profile are discussed under the sub-headings "Alteration of a user equipment timing offset measurement", "Adaptation of an uplink signal search window" and "Further adjustments based on a user equipment mobility profile".

Determination of a User Equipment Mobility Profile

According to some of the example embodiments, the user equipment mobility profile may comprise multiple types of information. An example of such information may be a user equipment speed. The user equipment speed may be obtained, for example, by measuring Doppler speed of the user equipment. Another example type of information comprised in the mobility profile is a user equipment position, for example, geographical coordinates or a user equipment position with respect to a known reference with a pre-determined location. The user equipment position may be obtained by using a suitable positioning method such as Enhanced cell ID (e.g., using cell ID, timing advance, etc.), OTDOA, UTDOA, GNSS, A-GNSS, etc. The user equipment may also report its position to the serving node or it can be determined by the network node depending upon the positioning method.

Another example of information comprised in the mobility profile is a user equipment direction of motion. The user equipment direction of motion may be obtained by measuring a direction of arrival of signal, for example, an angle of arrival (AoA) or a direction of arrival (DoA) measurement performed by the radio node serving the user equipment. A further example of information comprised in the mobility profile is a user equipment acceleration, which may be measured by observing the change in the user equipment speed. Yet another example of information that may be comprised in the mobility profile is a user equipment trajectory, for example, an overall path of motion, etc. The user equipment trajectory may be represented by two or more sets of geographical coordinates along the trajectory followed by the user equipment. The user equipment trajectory may be determined by the serving node or can be logged by user equipment and reported to the network.

Typically the above information can be obtained by measuring signals transmitted by the user equipment in which case the measurements can be done in the serving radio node. The information can also be obtained by using the measurements done by the user equipment and reported to network node (e.g. serving node, positioning node, etc.). The user equipment itself may provide one or more aspects related to its mobility profile and report them to network.

According to some of the example embodiments, the user equipment mobility profile may be determined explicitly or implicitly. The explicit user equipment mobility profile may be determined based on signals received by the user equipment and/or transmitted by the user equipment. This enables the network to acquire more specific and detail information about the user equipment mobility profile.

The implicit user equipment mobility profile may be determined based on deployment scenario. This enables the network to acquire approximate information about the user equipment mobility profile. For example, if the user equipment is served by a radio node serving user equipments in a high speed train or user equipments primarily located on a motorway, the network may implicitly determine the user equipment's speed, direction, etc. For example, the direction of motion of a train, speed limit on motorway, typical speed of a train on a certain track, etc., may be used by the network node to determine the user equipment speed, direction of motion, etc.

Applicable Scenarios for Using User Equipment Timing Offset Measurements

According to some of the example embodiments, the serving network node may receive a user equipment time offset measurement (e.g., UE UL PSC and UL DPCCH chip offset with respect to the target cell frame boundary or UE UL transmit timing offset with respect to the target cell frame boundary) from the user equipment. The user equipment typically reports this measurement to the serving node in response to receiving a request or a measurement configuration message.

The serving network node may also obtain or acquire the user equipment mobility profile of this user equipment, which reports the time offset measurement. The user equipment mobility profile may be obtained according to one or more methods described herein or known in the art.

Consider the following example scenario: at T0 the user equipment time offset measurement is received at the serving node; at T1 the user equipment time offset measurement becomes available at the target network node for detecting user equipment UL signals; at T2 the target node starts using the received user equipment time offset measurement for detecting user equipment UL signals; and at T3 the target node stops using the received user equipment time offset measurement for detecting user equipment UL signals.

Some of the example embodiments presented herein enable the serving network node to determine the impact of the user equipment mobility profile based on the accuracy or validity of the user equipment time offset with respect to a target cell frame timing measurement. Specifically, the serving network node may determine the accuracy or validity of the user equipment timing offset measurement when the measurement becomes available at or is used by the target node at different time instances (e.g., T1, T2, T3) for detecting user equipment UL timing. For example, the user equipment speed and direction may be used by the serving node to determine the expected change in the propagation delay between the user equipment and the target cell, and/or between serving node and the user equipment, by the time the time offset, with respect to the target cell frame timing measurement, is used by the target node.

The serving node may also determine the T1 or T1-T0 delay for signaling the time offset measurement to the target node based on, for example, historical data, past measurement reporting delay, pre-determined knowledge of delay on backhaul network interfaces (e.g., estimated by round trip time of procedures involving request and response messages), etc.

According to some of the example embodiments, if the expected change in the propagation delay is longer than a threshold (e.g., more than 3 μs) then the serving node may not forward the time offset measurement to the target node. Alternatively, the serving node may forward the time offset measurement to the target node but also send a flag or an indicator indicating that the said measurement is unreliable or may become unreliable over certain time period (e.g., after 500 ms). It is then up to the target node whether to use the measurement for detecting the UL timing of user equipment or modify the measurement or adapt its receiver window, as will be explained in greater detail under subsequent sub-headings.

According to some of the example embodiments, when receiving a request from a target node to provide the user equipment transmit time offset with respect to the target cell frame timing, the serving node may take a number of actions. First, the serving node may determine the mobility profile of the user equipment, which is associated with the target node's request, using any method discussed herein or known in the art. Alternatively, the source node may request the user equipment to perform a time offset measurement with respect to the target cell frame timing measurement only if the user equipment speed is below a threshold and/or if the expected accuracy or validity of the user equipment time offset with respect to the target cell frame timing measurement, depending upon the user equipment speed, is within a limit. Furthermore, the source node may inform the target node that the requested user equipment time offset, with respect to the target cell frame timing measurement, is not provided due to an expectedly unreliable measurement, for example, due to a higher speed of the said user equipment.

Alteration of a User Equipment Timing Offset Measurement

According to some of the example embodiments, once the network node has information about the user equipment mobility profile, the network node (source or target) may alter the user equipment time offset, with respect to the target cell frame timing measurement, by applying a compensation to account for user equipment mobility profile. For example, this may be applied by adding the expected change in the propagation between the user equipment and the serving node, and also between the user equipment and the target node, over a certain time period (D). The compensation may be applied by the serving node. The serving node may thereafter send the compensated measurement to the target node. In this example embodiment, the time period (D) may be equal to T1-T0 or even T2-T0 or even T3-T0.

According to some of the example embodiments, the target node may apply the compensation (e.g., using the value D as explained above) to the received time offset measurement. In this example embodiment, it is assumed that the target node has information about the user equipment mobility profile. According to some of the example embodiments, it may also be pre-defined as to which node will apply the compensation. The pre-definition may prevent the situation in which both serving and target nodes apply the compensation.

According to some of the example embodiments, the serving node may signal the user equipment time offset, with respect to the target cell frame timing measurement, with compensation and a second user equipment time offset without compensation. The target node may also apply compensation and use a suitable function which combines the two compensated measurements. The combined measurement may enhance the reliability of the results. Examples of such functions are an average, xth percentile, median, etc.

Adaptation of an Uplink Signal Search Window

According to some of the example embodiments, the target node, which uses the user equipment time offset, with respect to the target cell frame timing measurement, may be informed by the serving node about the user equipment mobility profile of the user equipment. The target node may be, additionally or alternatively, informed of an indication that the reported user equipment time offset may become unreliable or obsolete after certain time, with respect to a reference time (e.g., T0, or from completion of measurement), for example, will become unreliable after 500 ms from T0. The target node may be, additionally or alternatively, informed of an expected change in propagation delay of the user equipment, for example, between the user equipment and the serving node and/or between user equipment and the target node.

The target node may use this information to adapt one or more parameters of its radio receiver for detecting uplink signals transmitted by the user equipment when using the user equipment time offset. For example, if the user equipment speed is above a certain threshold (e.g., 200 km/hr) and/or, for example, a change in propagation delay over 500 ms is 1 μs or more, the target node may extend its receiver window (e.g., the time span over which radio node searched for uplink signals) by a certain margin (e.g., ±2 μs). This may enable the network node to easily detect the uplink signals transmitted by the said user equipment.

Further Adjustments Based on a User Equipment Mobility Profile

The example embodiments presented herein related to the use of a user equipment time by accounting for a user equipment mobility profile. It should be appreciated that the example embodiments are also applicable to any timing measurement which involves user equipment transmitted signals and/or which are performed by the user equipment on downlink transmitted signals.

The compensation may be applied to the timing measurement by the serving node or by the target node or by any network node which uses the timing measurement for one or more purposes. For example, the compensation to account for a user equipment mobility profile (e.g., speed, direction of motion, acceleration, etc.) may be applied by the serving node (e.g., RNC or Node B) in HSPA to the PRACH propagation delay measured by the serving Node B. The Node B serving this user equipment may use the compensated PRACH propagation delay performed on the user equipment transmitted signals when setting the search window for searching the user equipment transmitted signals.

Example Node Configuration

Figure 4:
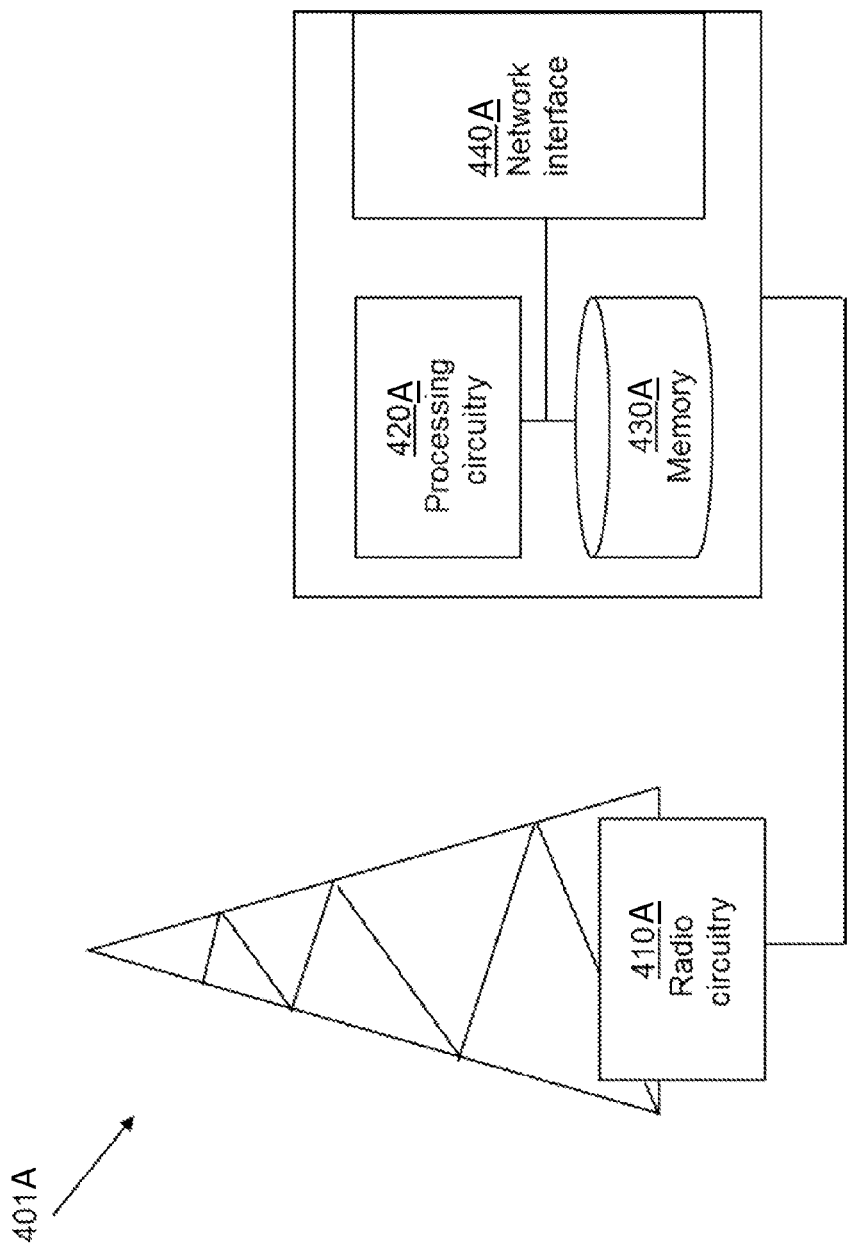
FIGS. 4 and 5 are example node configurations of a source and target network node, respectively, according to some of the example embodiments.

FIG. 4 illustrates an example node configuration of a source network node 401A (e.g., base station) which may perform some of the example embodiments described herein. The source network node 401A may comprise radio circuitry or a communication port 410A that may be configured to receive and/or transmit communication data, instructions, and/or messages. It should be appreciated that the radio circuitry or communication port 410A may be comprised as any number of transceiving, receiving, and/or transmitting units or circuitry. It should further be appreciated that the radio circuitry or communication port 410A may be in the form of any input or output communications port known in the art.

The radio circuitry or communication port 410A may comprise RF circuitry and baseband processing circuitry (not shown).

The source network node 401A may also comprise a processing unit or circuitry 420A which may be configured to manage or provide management based on a user equipment time offset measurement and user equipment mobility profile. The processing circuitry 420A may be any suitable type of computation unit, e.g. a microprocessor, digital signal processor (DSP), field programmable gate array (FPGA), or application specific integrated circuit (ASIC), or any other form of circuitry. The source network node 401A may further comprise a memory unit or circuitry 430A which may be any suitable type of computer readable memory and may be of volatile and/or non-volatile type. The memory 430A may be configured to store received, transmitted, and/or measured data, device parameters, communication priorities, and/or executable program instructions. The source network node 401A may also comprise a network interface 440A for interfacing the source network node 401A with other network components.

Figure 5:
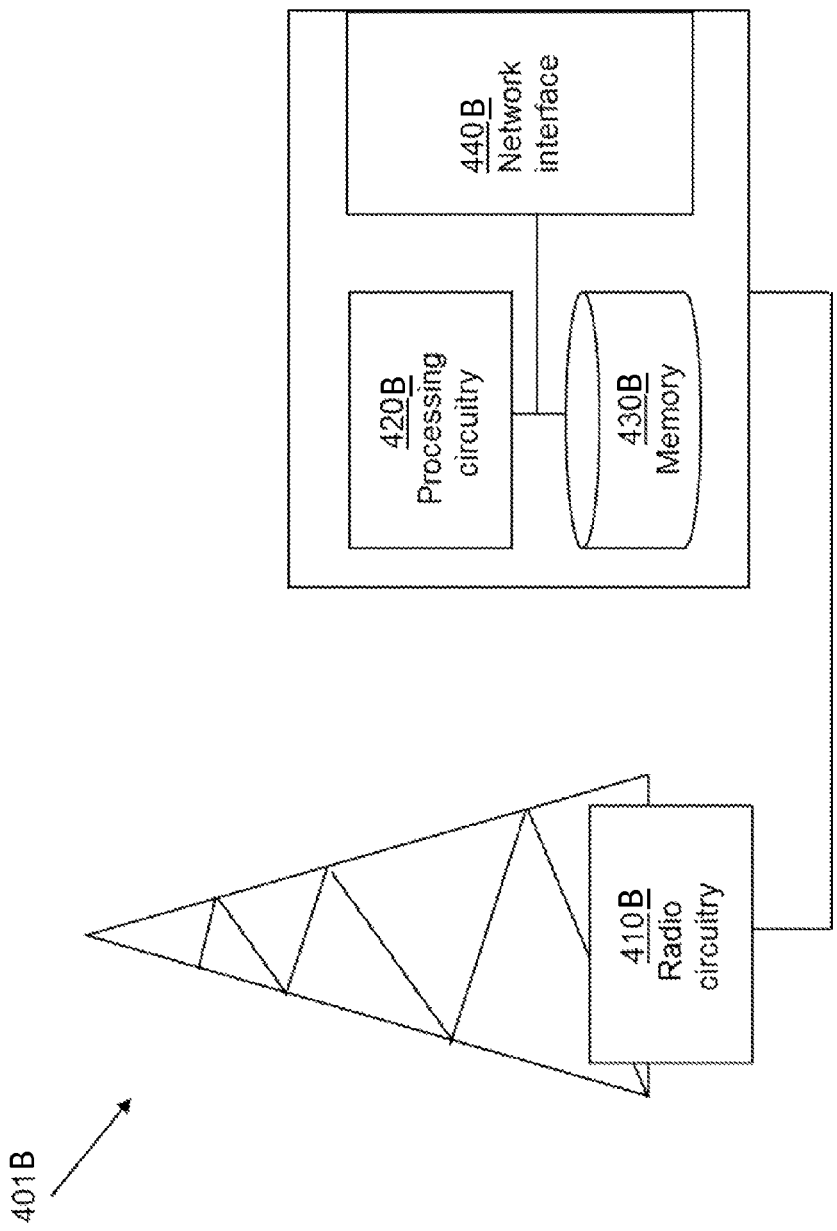

FIG. 5 illustrates an example node configuration of a target network node 401B (e.g., base station) which may perform some of the example embodiments described herein. The target base station 401B may comprise radio circuitry or a communication port 410B that may be configured to receive and/or transmit communication data, instructions, and/or messages. It should be appreciated that the radio circuitry or communication port 410B may be comprised as any number of transceiving, receiving, and/or transmitting units or circuitry. It should further be appreciated that the radio circuitry or communication port 410B may be in the form of any input or output communications port known in the art. The radio circuitry or communication port 410B may comprise RF circuitry and baseband processing circuitry (not shown).

The target network node 401B may also comprise a processing unit or circuitry 420B which may be configured to manage or provide management based on a user equipment time offset measurement and user equipment mobility profile. The processing circuitry 420B may be any suitable type of computation unit, e.g. a microprocessor, digital signal processor (DSP), field programmable gate array (FPGA), or application specific integrated circuit (ASIC), or any other form of circuitry. The target network node 401B may further comprise a memory unit or circuitry 430B which may be any suitable type of computer readable memory and may be of volatile and/or non-volatile type. The memory 430B may be configured to store received, transmitted, and/or measured data, device parameters, communication priorities, and/or executable program instructions. The target network node 401B may also comprise a network interface 440B for interfacing the target network node 401B with other network components.

Example Node Operations

Figure 6:
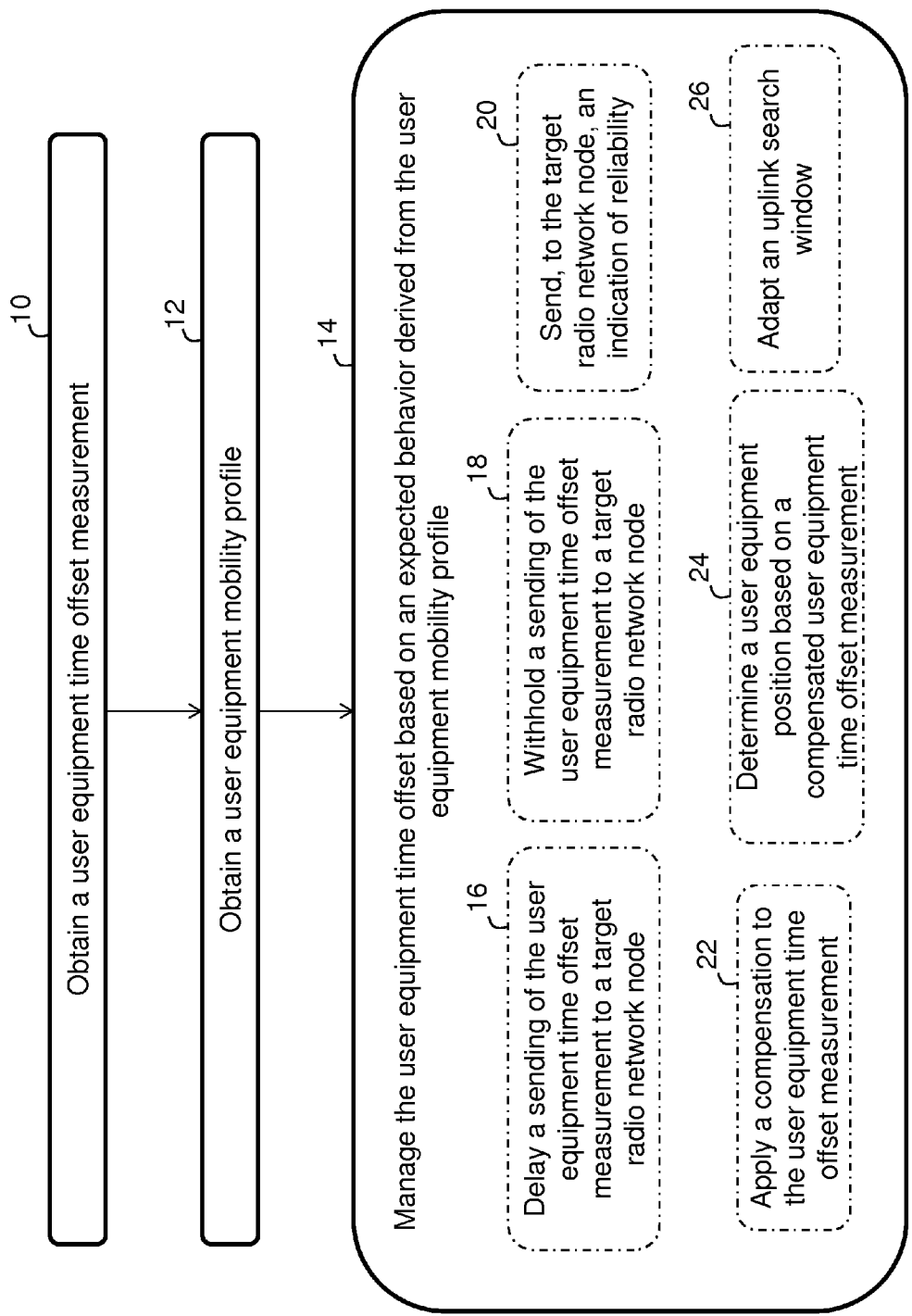
FIG. 6 is a flow diagram depicting example operations of a network node, which may be a source or target network node of FIGS. 4 and 5, respectively, according to some of the example embodiments.

FIG. 6 is a flow diagram depicting example operations which may be taken by a network node in providing management based on a user equipment time offset measurement and user equipment mobility profile. It should be appreciated that the network node may the source network node 401A described in FIG. 4 or the target network node 401B described in FIG. 5. It should also be appreciated that FIG. 6 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The network node 401A or 401B is configured to obtain 10, from a user equipment 101 or a serving radio network node 401A, a user equipment time offset measurement. The radio circuitry 410A or 410B is configured to obtain, from a user equipment 101 or a serving radio network node 401A, the user equipment time offset measurement.

According to some of the example embodiments, the user equipment time offset measurement may be obtained from the user equipment 101 when the network node is a serving radio network node 401A (e.g., a serving base station). According to some of the example embodiments, the user equipment time offset measurement may be obtained from the serving radio network node 401A when the network node is a target radio network node 401B (e.g., a target base station).

According to some of the example embodiments, the user equipment time offset measurement may comprise any one or more of a difference between a transmit timing of the user equipment to a serving cell and a received frame timing of a target cell at the user equipment; a user equipment uplink Primary Scrambling Code and/or an uplink Dedicated Physical Control Channel chip offset with respect to a target cell frame boundary; a user equipment uplink transmit timing offset with respect to a target cell frame boundary; a System Frame Number-Connection Frame Number observed time difference measurement; a System Frame Number-System Frame Number observed time difference measurement; a user equipment receive-transmit time difference measurement; a radio network node receive-transmit time difference measurement; a timing advance; propagation delay of signals transmitted between the user equipment and a serving radio network node; and a propagation delay of signals transmitted between the user equipment and a target radio network node, or any other such measurement known in the art. Operation 10 is further explained under at least the sub-heading "Applicable scenarios for using user equipment timing offset measurements".

Operation 12

The network node 401A or 401B is further configured to obtain 12, from the user equipment 101 or the serving radio network node 401A, a user equipment mobility profile. The radio circuitry 410A or 410B is configured to obtain, from the user equipment 101 or the serving radio network node 401A or 401B, the user equipment mobility profile.

According to some of the example embodiments, the user equipment mobility profile may be obtained from the user equipment 101 when the network node is a serving radio network node 401A (e.g., a serving base station). According to some of the example embodiments, the user equipment mobility profile may be obtained from the serving radio network node 401A when the network node is a target radio network node 401B (e.g., a target base station).

According to some of the example embodiments, the user equipment mobility profile may comprise any one or more of a Doppler frequency or speed estimate based on a Doppler frequency, a current position, a direction of motion, an acceleration and a trajectory of the user equipment.

According to some of the example embodiments, the user equipment mobility profile may be based on radio measurements performed by the user equipment 101 and/or by the network and/or information about deployment characteristics of the network in which the user equipment operates. Operation 12 is further explained under at least the sub-heading "Determination of a user equipment mobility profile".

Operation 14

The network node 401A or 401B is further configured to manage 14 the user equipment time offset measurement based on expected user equipment mobility behavior derived from the user equipment mobility profile. The processing circuitry 420A or 420B is configured to manage the user equipment time offset measurement based on expected user equipment mobility behavior derived from the user equipment mobility profile. Operation 14 is described under at least the sub-headings "Alteration of a user equipment timing offset measurement", "Adaptation of an uplink signal search window" and "Further adjustments based on a user equipment mobility profile".

Example Operation 16

According to some of the example embodiments, the network node may be a serving radio network node 401A (e.g., a server base station). In such example embodiments, the managing 14 may further comprise delaying 16 a sending of the user equipment time offset measurement to a target network radio node 401B. The radio circuitry 410A and/or the processing circuitry 420A may delay the sending of the user equipment time offset measurement to the target network radio node 401B. Thus, according to some of the example embodiments, the sending of the user equipment time offset measurement may be delayed to account for any adjustments which may be needed due to the user equipment mobility profile.

Example Operation 18

According to some of the example embodiments, the network node may be a serving radio network node 401A (e.g., a server base station). In such example embodiments, the managing 14 may further comprise withholding 18 a sending of the user equipment time offset measurement to a target network radio node 401B. The radio circuitry 410A and/or the processing circuitry 420A may withhold the sending of the user equipment time offset measurement to the target network radio node 401B. For example, if the user equipment mobility profile indicates that the user equipment is highly mobile, the reliability of the user equipment timing offset measurement may be low. Thus, the source network node 401A may decide not to send the measurement information.

Example Operation 20

According to some of the example embodiments, the network node may be a serving radio network node 401A (e.g., a server base station). In such example embodiments, the managing 14 may further comprise sending 20, to the target radio network node 401B, an indication that the user equipment timing offset measurement is unreliable. The radio circuitry 410A and/or the processing circuitry 420A may send, to the target radio node 401B, the indication that the user equipment time offset measurement is unreliable. According to some of the example embodiments, the indication may prompt the target network node 401B to take certain actions with respect to, for example, the reliability of the user equipment timing offset measurement.

Example Operation 22

According to some of the example embodiments, the network node may be either a serving radio network node 401A (e.g., a serving base station) or a target radio network node 401B (e.g., a target base station). In such example embodiments, the managing 14 may further comprise applying 22 a compensation to the user equipment time offset measurement to account for the expected user equipment mobility behavior. The processing circuitry 420A or 420B may be configured to apply the compensation to the user equipment time offset measurement to account for the expected user equipment mobility behavior. Example operation 24 is further described under at least sub-heading "Alteration of a user equipment timing offset measurement".

Example Operation 24

According to some of the example embodiments, the network node may be either a serving radio network node 401A (e.g., a serving base station) or a target radio network node 401B (e.g., a target base station). In such example embodiments, the managing 14 may further comprise determining 24 a user equipment position. The processing circuitry 420A or 420B may be configured to determine the user equipment position. According to some of the example embodiments, the user equipment position may be obtained with the knowledge of the user equipment mobility profile or from the user equipment mobility profile itself. The user equipment position may be used, for example, in mobility or relocation procedures.

Example Operation 26

According to some of the example embodiments, the network node may be either a serving radio network node 401A (e.g., a serving base station) or a target radio network node 401B (e.g., a target base station). In such example embodiments, the managing 14 may further comprise adapting 26 an uplink search window for searching for uplink signals from a user equipment. The processing circuitry may be configured to adapt the uplink search window for searching for uplink signals from a user equipment. Example operation 26 is further explained under at least the sub-heading "Adaptation of an uplink signal search window".

According to some of the example embodiments, the managing 14, as well as all example operations associated with the managing (e.g., example operations 16-26) may occur during a mobility or relocation procedure of the user equipment. Examples of such a mobility procedure may be a RAU, TAU or HO. It should be appreciated that the managing 14, and all associated example operations, may also occur during a cell activation by the source or target network node.

CONCLUSION

It should be noted that although terminology from 3GPP LTE has been used herein to explain the example embodiments, this should not be seen as limiting the scope of the example embodiments to only the aforementioned system. Other wireless systems, comprising WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a network node, for managing a user equipment time offset measurement, the method comprising:
   obtaining, from a user equipment or a serving radio network node, the user equipment time offset measurement;
   obtaining, from the user equipment or the serving radio network node, a user equipment mobility profile; and
   managing the user equipment time offset measurement based on expected user equipment mobility behavior derived from the user equipment mobility profile,
   wherein the network node comprises a serving radio network node;
   the method further comprising withholding a sending of the user equipment time offset measurement to a target radio network node, further comprising sending an indication that the user equipment time offset measurement is unreliable to the target radio network node.

2. The method of claim 1, wherein the user equipment mobility profile comprises at least one of: a Doppler frequency or speed estimate based on Doppler frequency, a current position, a direction of motion, an acceleration, and a trajectory of the user equipment.

3. The method of claim 1, wherein the user equipment mobility profile is based on at least one of: information about deployment characteristics of the network in which the user equipment operates, and radio measurements performed by at least one of the user equipment and the network.

4. The method of claim 1:
   wherein the network node comprises a serving radio network node;
   the method further comprising delaying a sending of the user equipment time offset measurement to a target radio network node.

5. The method of claim 1:
   wherein the network node comprises a serving radio network node or a target radio network node;
   the method further comprising applying a compensation to the user equipment time offset measurement to generate a compensated user equipment time offset measurement that accounts for the expected user equipment mobility behavior.

6. The method of claim 5:
   wherein the network node comprises the serving radio network node, the target radio network node, or a positioning node;
   the method further comprising using the compensated user equipment time offset measurement for determining a user equipment position.

7. The method of claim 1:
   wherein the network node comprises a serving radio network node or a target radio network node;
   the method further comprising adapting an uplink search window for searching for uplink signals from the user equipment.

8. The method of claim 1, wherein the managing the user equipment time offset measurement occurs during a user equipment mobility procedure or a relocation procedure.

9. The method according to claim 1, wherein the user equipment time offset measurement comprises at least one of the following:
   a difference between a transmit timing of the user equipment to a serving cell and a received frame timing of a target cell at the user equipment;
   at least one of a user equipment uplink Primary Scrambling Code and an uplink Dedicated Physical Control Channel chip offset with respect to a target cell frame boundary;
   a user equipment uplink transmit timing offset with respect to the target cell frame boundary;
   a System Frame Number-Connection Frame Number observed time difference measurement;
   a System Frame Number-System Frame Number observed time difference measurement;
   a user equipment receive-transmit time difference measurement;
   a radio network node receive-transmit time difference measurement;
   a timing advance;

a propagation delay of signals transmitted between the user equipment and the serving radio network node; and a propagation delay of signals transmitted between the user equipment and a target radio network node.

10. A network node for management of a user equipment time offset measurement, the network node comprising:

radio circuitry configured to receive, from a user equipment or a serving radio network node:

a user equipment time offset measurement; and a user equipment mobility profile; and processing circuitry configured to manage the user equipment time offset measurement based on expected user equipment mobility behavior derived from the user equipment mobility profile, wherein the network node comprises a serving radio network node;

wherein the processing circuitry is further configured to withhold a sending of the user equipment time offset measurement to a target radio network node, wherein the radio circuitry is further configured to send an indication that the user equipment time offset measurement is unreliable to the target radio network node.

11. The network node of claim 10, wherein the user equipment mobility profile comprises at least one of: a Doppler frequency or speed estimate based on Doppler frequency, a current position, a direction of motion, an acceleration, and a trajectory of the user equipment.

12. The network node of claim 10, wherein the user equipment mobility profile is based on at least one of: information about deployment characteristics of the network in which the user equipment operates, and radio measurements performed by at least one of the user equipment and the network.

13. The network node of claim 10:

wherein the network node comprises a serving radio network node;

wherein the processing circuitry is further configured to delay a sending of the user equipment time offset measurement to a target radio network node.

14. The network node of claim 10:

wherein the network node comprises a serving radio network node or a target radio network node;

wherein the processing circuitry is further configured to apply a compensation to the user equipment time offset measurement to generate a compensated user equipment time offset that accounts for the expected user equipment mobility behavior.

15. The network node of claim 14:

wherein the network node comprises the serving network node, the target radio network node, or a positioning node;

wherein the processing circuitry is further configured to utilize the compensated user equipment time offset to determine a user equipment position.

16. The network node of claim 10:

wherein the network node comprises a serving radio network node or a target radio network node;

wherein the processing circuitry is further configured to adapt an uplink search window for searching for uplink signals from the user equipment.

17. The network node of claim 10, wherein the processing circuitry is further configured to manage the user equipment time offset measurement during a user equipment mobility procedure or a relocation procedure.

18. The network node of claim 10, wherein time offset measurement comprises at least one of the following:

a difference between a transmit timing of the user equipment to a serving cell and a received frame timing of a target cell at the user equipment;

at least one of a user equipment uplink Primary Scrambling Code and an uplink Dedicated Physical Control Channel chip offset with respect to a target cell frame boundary;

a user equipment uplink transmit timing offset with respect to a target cell frame boundary;

a System Frame Number-Connection Frame Number observed time difference measurement;

a System Frame Number-System Frame Number observed time difference measurement;

a user equipment receive-transmit time difference measurement;

a radio network node receive-transmit time difference measurement;

a timing advance;

a propagation delay of signals transmitted between the user equipment and the serving radio node; and a propagation delay of signals transmitted between the user equipment and a target radio node.

* * * * *